(12) United States Patent
Peeters et al.

(10) Patent No.: US 7,871,024 B2
(45) Date of Patent: Jan. 18, 2011

(54) MANURE SPREADER WITH REVERSE FLIGHTING

(75) Inventors: Kenneth J. Peeters, Bear Creek, WI (US); Gary L. Wilke, Shawano, WI (US); Gregory L. Landon, Shawano, WI (US)

(73) Assignee: H & S Manufacturing Co., Inc., Marshfield, WI (US)

( * ) Notice: Subject to any disclaimer, the term of this patent is extended or adjusted under 35 U.S.C. 154(b) by 532 days.

(21) Appl. No.: 11/881,735

(22) Filed: Jul. 27, 2007

(65) Prior Publication Data

US 2009/0026284 A1    Jan. 29, 2009

(51) Int. Cl.
- A01C 17/00 (2006.01)
- E01C 19/20 (2006.01)
- B01F 15/02 (2006.01)
- B01F 7/24 (2006.01)
- B01F 7/00 (2006.01)

(52) U.S. Cl. .................. 239/667; 239/676; 239/679; 239/682; 366/196; 366/321; 366/324

(58) Field of Classification Search .............. 239/650, 239/661, 663–668, 671–673, 675, 676, 679–682, 239/687; 366/196, 318, 319, 321, 324, 325.1, 366/327.1

See application file for complete search history.

(56) References Cited

U.S. PATENT DOCUMENTS

| | | | |
|---|---|---|---|
| RE22,020 E | 2/1942 | Fulkerson et al. | |
| 2,549,852 A | 4/1951 | Pratt | |
| 2,619,355 A | 11/1952 | Trees | |
| 2,891,655 A | 6/1959 | Saiberlich | |
| 2,959,421 A | 11/1960 | Van der Lely et al. | |
| 3,123,363 A | 3/1964 | Hedtke | |
| 3,206,215 A | 9/1965 | Jong | |
| 3,338,562 A * | 8/1967 | Fox | 366/287 |
| 3,474,926 A | 10/1969 | Skromme | |
| 3,539,113 A | 11/1970 | Tyler | |

(Continued)

FOREIGN PATENT DOCUMENTS

BE          512003       1/1951

(Continued)

OTHER PUBLICATIONS

H & S Manufacturing Co. Inc., H & S Heavy Duty Vtwin Manure Spreaders, 4 page Marketing Brochure, Marshfield, WI.

(Continued)

*Primary Examiner*—Darren W Gorman
(74) *Attorney, Agent, or Firm*—Patterson Thuente Christensen Pedersen, P.A.

(57) ABSTRACT

A manure spreader includes a box for containing manure. The manure spreader box includes a bottom wall, a front wall, two side walls, and a manure discharge opening. The manure spreader also includes a wheeled frame supporting the box, and a vertical beater assembly for engaging and expelling manure. The vertical beater assembly includes a first vertical beater rotatable about a first axis and includes a shaft having a first flighting forming a left-handed helix, and a second flighting forming a right-handed helix. The manure spreader also includes a manure transfer mechanism for moving manure contained in the box to the manure discharge opening for engagement with the vertical beater assembly.

20 Claims, 13 Drawing Sheets

U.S. PATENT DOCUMENTS

| | | | |
|---|---|---|---|
| 3,656,638 A | | 4/1972 | Hutton et al. |
| 3,749,321 A | | 7/1973 | Roiser |
| 4,026,476 A | | 5/1977 | Ipnar et al. |
| 4,072,272 A | | 2/1978 | Harder |
| 4,124,166 A | | 11/1978 | Lucas |
| 4,242,002 A | * | 12/1980 | Kawabata ................ 366/343 |
| 4,344,580 A | * | 8/1982 | Hoshall et al. ............. 241/60 |
| 4,350,303 A | | 9/1982 | Van der Lely |
| 4,473,184 A | | 9/1984 | Martin |
| 4,541,570 A | | 9/1985 | Rieke et al. |
| 4,585,266 A | | 4/1986 | Steinberg |
| 4,597,532 A | | 7/1986 | Linde et al. |
| 4,801,085 A | | 1/1989 | Fischer |
| 4,850,515 A | | 7/1989 | Cleland |
| 5,082,186 A | | 1/1992 | Bruns |
| 5,199,638 A | | 4/1993 | Fischer |
| 5,275,335 A | | 1/1994 | Knight et al. |
| 5,368,236 A | | 11/1994 | Meyer et al. |
| 5,379,940 A | | 1/1995 | Knight et al. |
| 5,385,403 A | | 1/1995 | Knight et al. |
| 5,386,943 A | | 2/1995 | Peeters |
| 5,435,494 A | | 7/1995 | Knight et al. |
| 5,501,404 A | | 3/1996 | Meyer et al. |
| 2006/0169806 A1 | * | 8/2006 | Neier et al. ................ 239/667 |

FOREIGN PATENT DOCUMENTS

| | | | |
|---|---|---|---|
| DE | | 925682 | 3/1955 |
| DE | | 1181965 | 11/1964 |
| DE | | 4134315 | 4/1993 |
| EP | | 0084872 | 8/1983 |
| EP | | 0104622 | 4/1984 |
| FR | | 1060948 | 4/1954 |
| FR | | 1158354 | 6/1958 |
| FR | | 1219937 | 5/1960 |
| FR | | 1254748 | 2/1961 |
| FR | | 1359185 | 4/1964 |
| FR | | 2342631 | 9/1977 |
| FR | | 2566226 | 12/1985 |
| FR | | 2703208 | 10/1994 |
| FR | | 2851411 A1 * | 8/2004 |
| GB | | 788850 | 1/1958 |
| GB | | 1030905 | 5/1966 |
| GB | | 1350527 | 4/1974 |
| GB | | 2328853 | 3/1999 |
| JP | | 63267205 | 4/1988 |
| JP | | 5030806 | 2/1993 |
| SU | | 1028266 | 7/1983 |
| SU | | 1253462 | 8/1986 |
| SU | | 1428247 | 10/1988 |
| SU | | 1482566 | 5/1989 |
| WO | WO 2007042804 A1 * | | 4/2007 |

OTHER PUBLICATIONS

H & S Manufacturing Co., Inc, All Purpose Manure Spreaders w/Vertical Beaters, 2 page Marketing Brochure, Marshfield, WI.

* cited by examiner

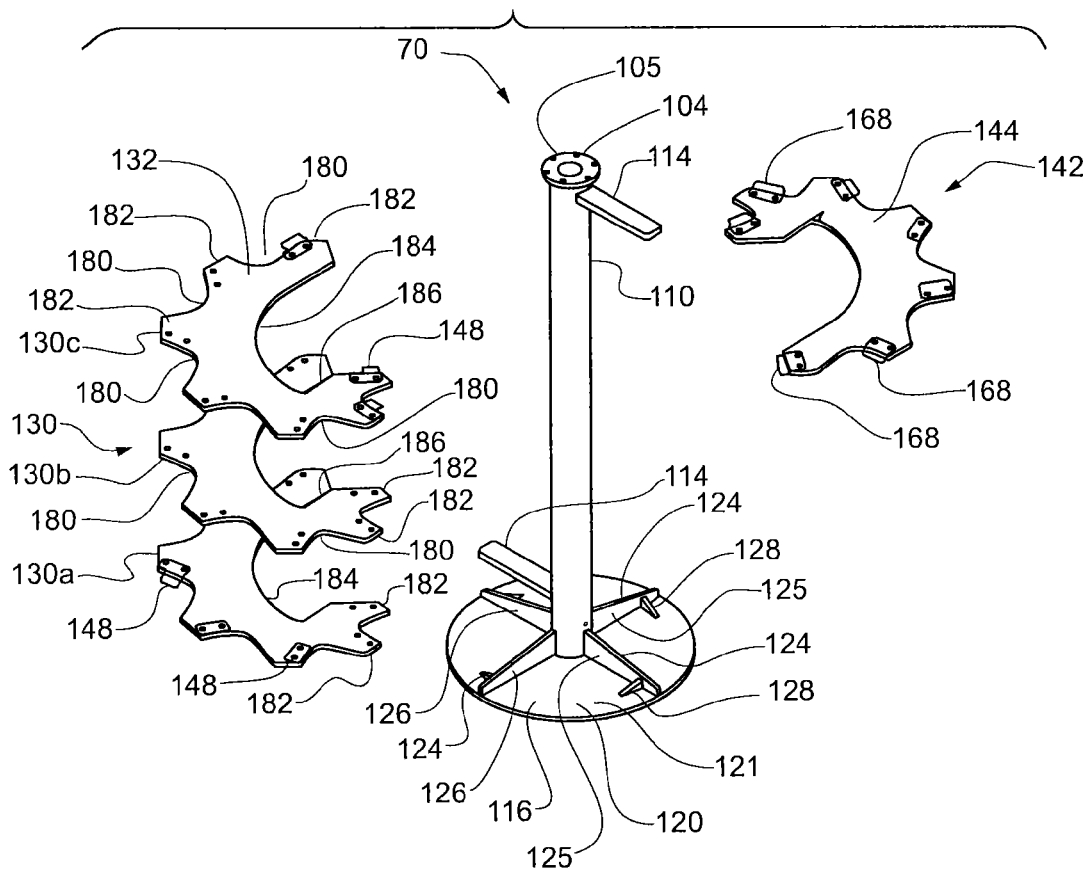

MANURE SPREADER WITH REVERSE FLIGHTING

FIELD OF THE INVENTION

The present invention relates generally to manure spreaders. More particularly, the present invention relates to a manure spreader with reverse-flighting vertical beaters.

BACKGROUND OF THE INVENTION

Manure spreaders are commonly used to transport and spread materials such as compost, straw, seed, crop residue, and especially manure. Commercially available manure spreaders typically employ a container for holding the manure to be spread, means for moving the manure in the container towards and into a discharge mechanism, and a discharge mechanism to expel or spread the manure. Moving manure through the container and into the discharge mechanism may be accomplished through the use of hydraulic pushgates, conveyors, augers, and the like. Examples of discharge mechanisms include rotating augers mounted horizontally or vertically, rotating discs, or combinations of the two. These discharge mechanisms may be located on the side or the rear of the manure spreader.

Manure spreaders that include one or more rotating augers, or beaters, mounted in a substantially vertical orientation with respect to the ground, hold many advantages over other types of manure spreaders. These advantages include the ability to spread a wide variety of manure compositions, a wide distribution, or spread, pattern, and ease in serviceability. However, spreaders that use such vertical beaters also hold many disadvantages with respect to safety and spread pattern.

Rotating vertical beaters are designed to expel manure away from the manure spreader in a controlled fashion, distributing manure onto a surface in a predictable, consistent pattern. Unfortunately, commercially available spreaders that use traditional vertical beater designs often expel manure unpredictably, and sometimes dangerously, back toward the manure spreader, or worse yet, toward the vehicle pulling the spreader. In the case of liquids, or soft manures, the unpredictable distribution may only result in a mere inconvenience to the user of the spreader. However, when the manure is a solid, or if the manure contains debris such as rocks, the manure striking the spreader, towing vehicle, or operator may cause damage or injury. To counter this problem, many manure spreaders include shields or guards to prevent manure and other debris such as rocks, dirt, and so on, from reaching the towing vehicle and operator.

Therefore, a need in the industry exists for a manure spreader with a discharge system that offers the advantages of vertical beaters, but with an improved, consistent spread pattern that limits the dangers of flying debris.

SUMMARY OF THE INVENTION

The present invention resolves many of the above-described deficiencies and drawbacks inherent with existing manure spreaders. For example, one embodiment of the present invention is a manure spreader that reduces or eliminates the amount of manure and debris expelled back towards a towing vehicle, while at the same time providing a uniform spread pattern. The manure spreader includes a box for containing manure. The manure spreader box includes a bottom wall, a front wall, two side walls, and a manure discharge opening. The manure spreader also includes a wheeled frame supporting the box, and a vertical beater assembly for engaging and expelling manure. The vertical beater assembly includes a first vertical beater rotatable about a first axis and includes a shaft having a first flighting forming a left-handed helix, and a second flighting forming a right-handed helix. The manure spreader also includes a manure transfer mechanism for moving manure contained in the box to the manure discharge opening for engagement with the vertical beater assembly.

Another embodiment of the present invention is a vertical beater for spreading manure that includes a shaft rotatable about an axis, a circular beater base attached to an end of the shaft such that the axis is substantially perpendicular to a surface of the base and first and second flighting sections. The first flighting section is affixed to a lower portion of the shaft, and forms a lower helix spiraling in a first direction about the shaft. The second flighting is affixed to an upper portion of the shaft and forms an upper helix spiraling in a second direction about the shaft. The second direction is substantially opposite the first direction.

In another embodiment, the present invention is a method of spreading manure onto a surface. The method includes inserting manure into a manure spreader, moving the manure in the manure spreader through a discharge opening using a manure transfer mechanism, and engaging the manure with a rotating vertical beater having a first helical flighting section and a second helical flighting section. The method also includes contacting a first portion of the manure with the first helical flighting and a second portion of the manure with the second helical flighting. Next, the first portion of the manure is expelled in a direction upward and away from the surface while expelling a second portion of the manure in a direction downward and toward the surface, causing a portion of the second portion of the manure to contact a portion of the first portion of the manure, thereby spreading the manure onto the surface.

The above summary of the invention is not intended to describe each illustrated embodiment or every implementation of the present invention. The figures and the detailed description that follow more particularly exemplify these embodiments.

BRIEF DESCRIPTION OF THE DRAWINGS

FIG. 6 is an exploded, perspective view of a right-side vertical beater.

DETAILED DESCRIPTION OF THE DRAWINGS

Figure 1:
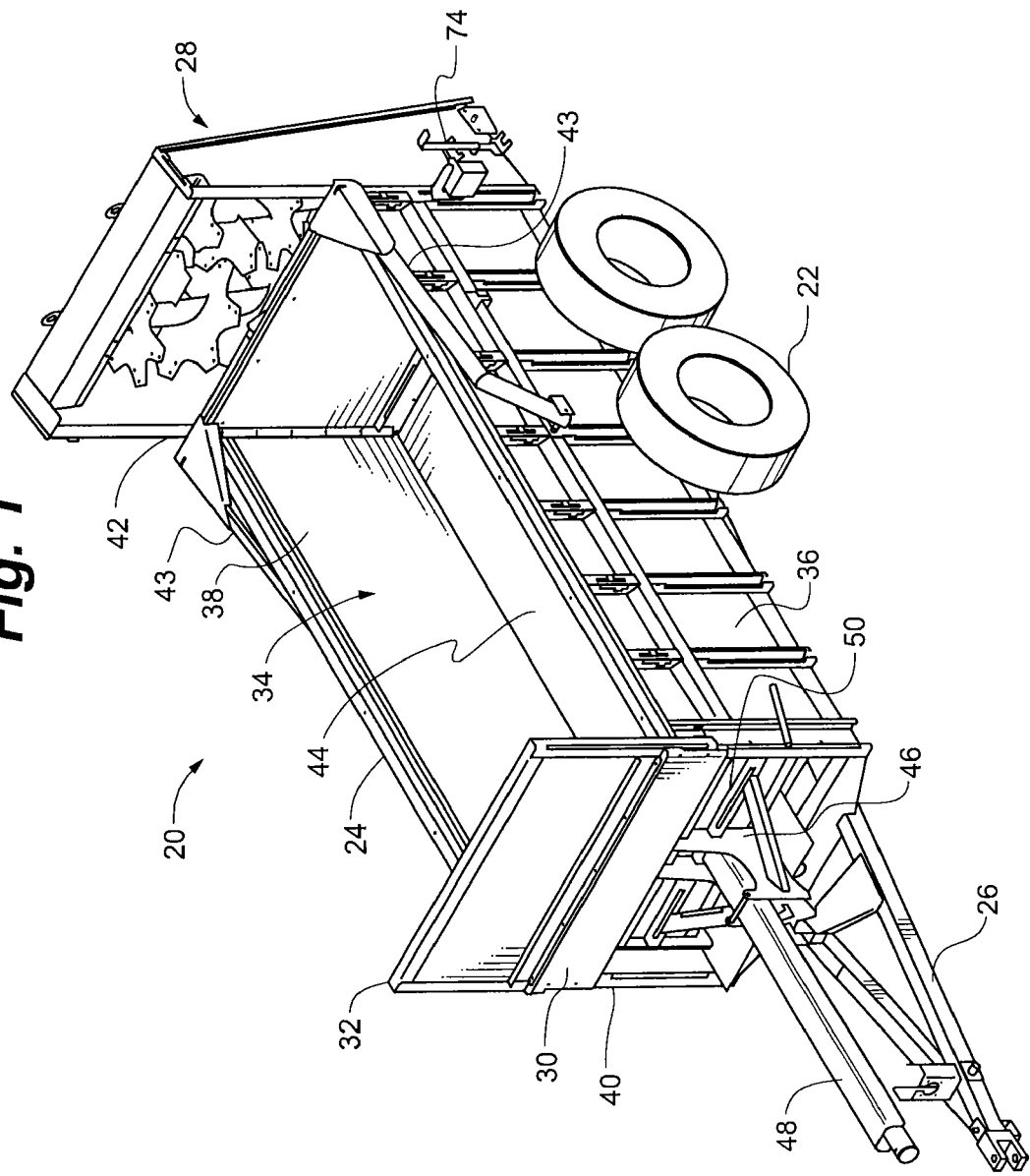
FIG. 1 is a front perspective view of a manure spreader with an attached vertical beater assembly.
Figure 2:
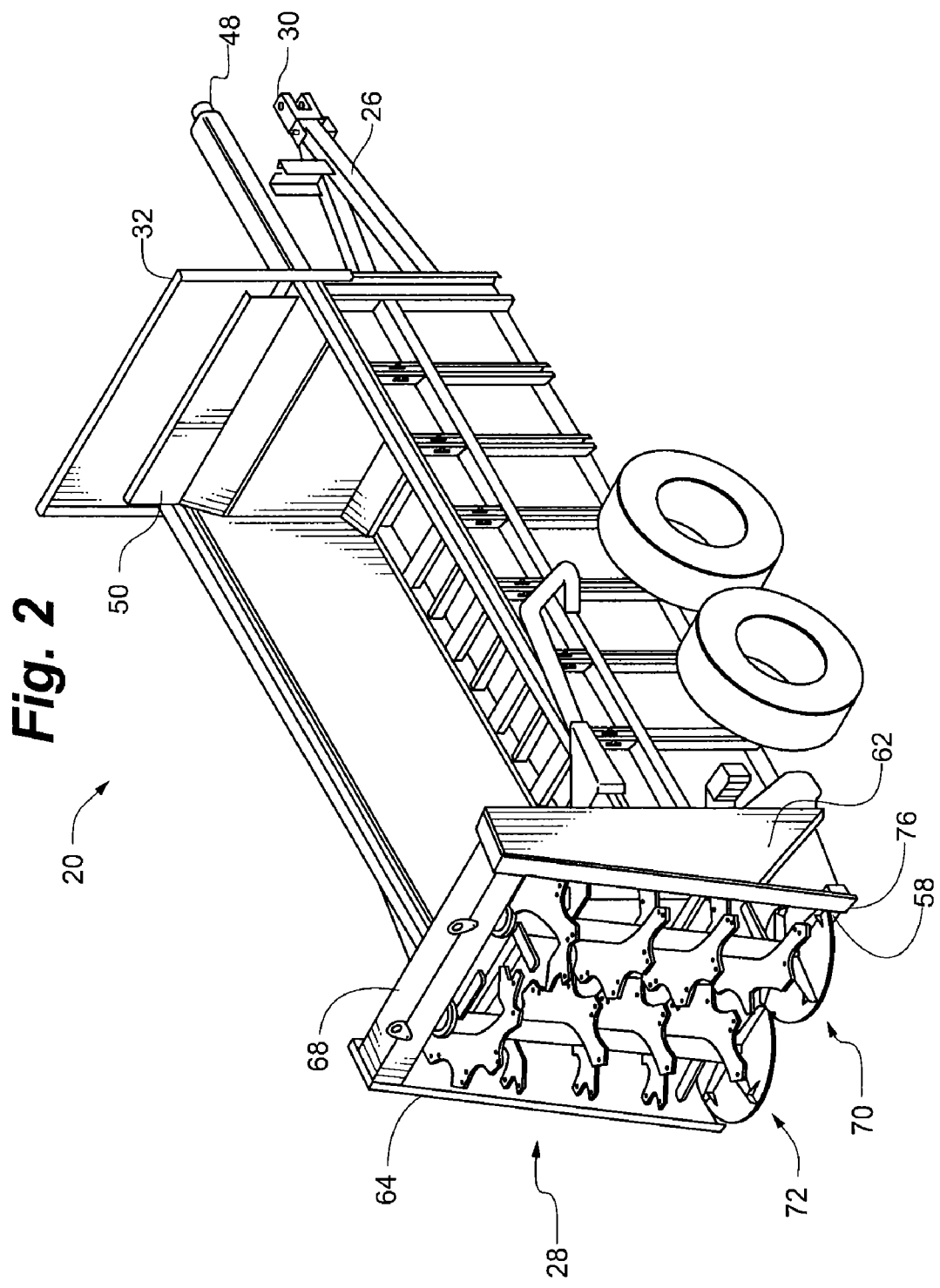
FIG. 2 is a rear perspective view of a manure spreader with an attached vertical beater assembly.
Figure 3:
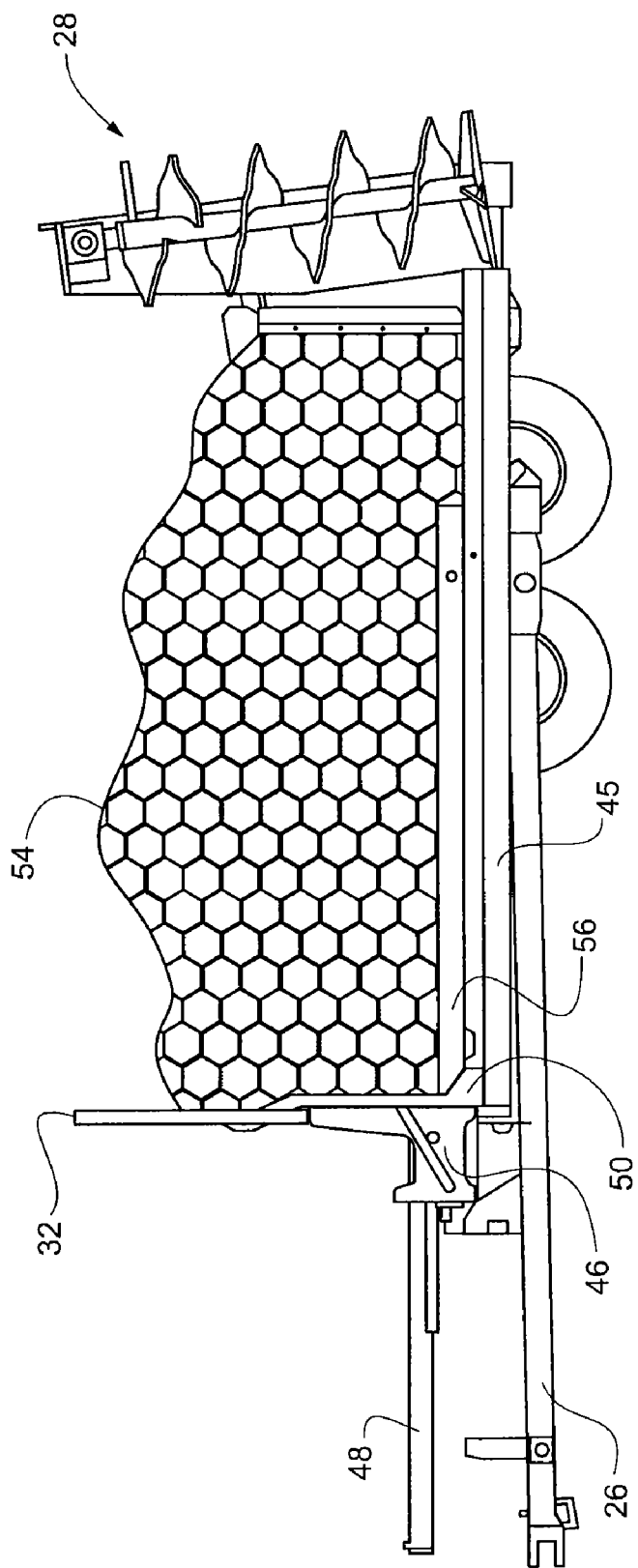
FIG. 3 is a cross-sectional view of a manure spreader with a load of manure in the box.

Referring to FIGS. 1-3, one embodiment of the present invention is a manure spreader 20. Manure spreader 20 includes an axle and wheel set 22, box 24, hitch 26, vertical beater assembly 28, manure transfer mechanism 30, and rock guard 32. Box 24 includes box interior 34 defined by left wall 36, right wall 38, front wall 40, rear gate 42, rear gate lift arms 43, and floor 44. Box 24 rests on axle and wheel set 22, while hitch 26 is attached to the box frame 45 (see FIG. 3) and front wall 40. Vertical beater assembly 28 is attached to the rear of manure spreader 20.

In one embodiment, the manure transfer mechanism 30 of manure spreader 20 includes hydraulic push-gate drive mechanism 46, hydraulic ram 48, and push gate 50. Driven by hydraulic ram 48 and push-gate drive mechanism 46, push gate 50 translates rearward, applying a force against manure 54 thereby moving manure 54 from the front wall 40 area of box 24 towards the rear of manure spreader 20 and the vertical beater assembly 28. Alternatively, a load bed 56 as depicted in FIG. 3 may work in combination with push gate 50 to move manure 54 towards the rear of manure spreader 20. Manure 54 rests on load bed 56 that translates rearward, carrying manure 54 towards vertical beater assembly 28 as push gate 50 pushes the load in the same direction. Although manure spreader 20 is depicted as a push-gate spreader, other embodiments of the manure spreader of the present invention may include auger-driven spreaders, conveyer-driven spreaders, apron-chain spreaders or spreaders that employ other means to move manure 54 rearward through box interior 34 and into vertical beater assembly 28.

Figure 4:
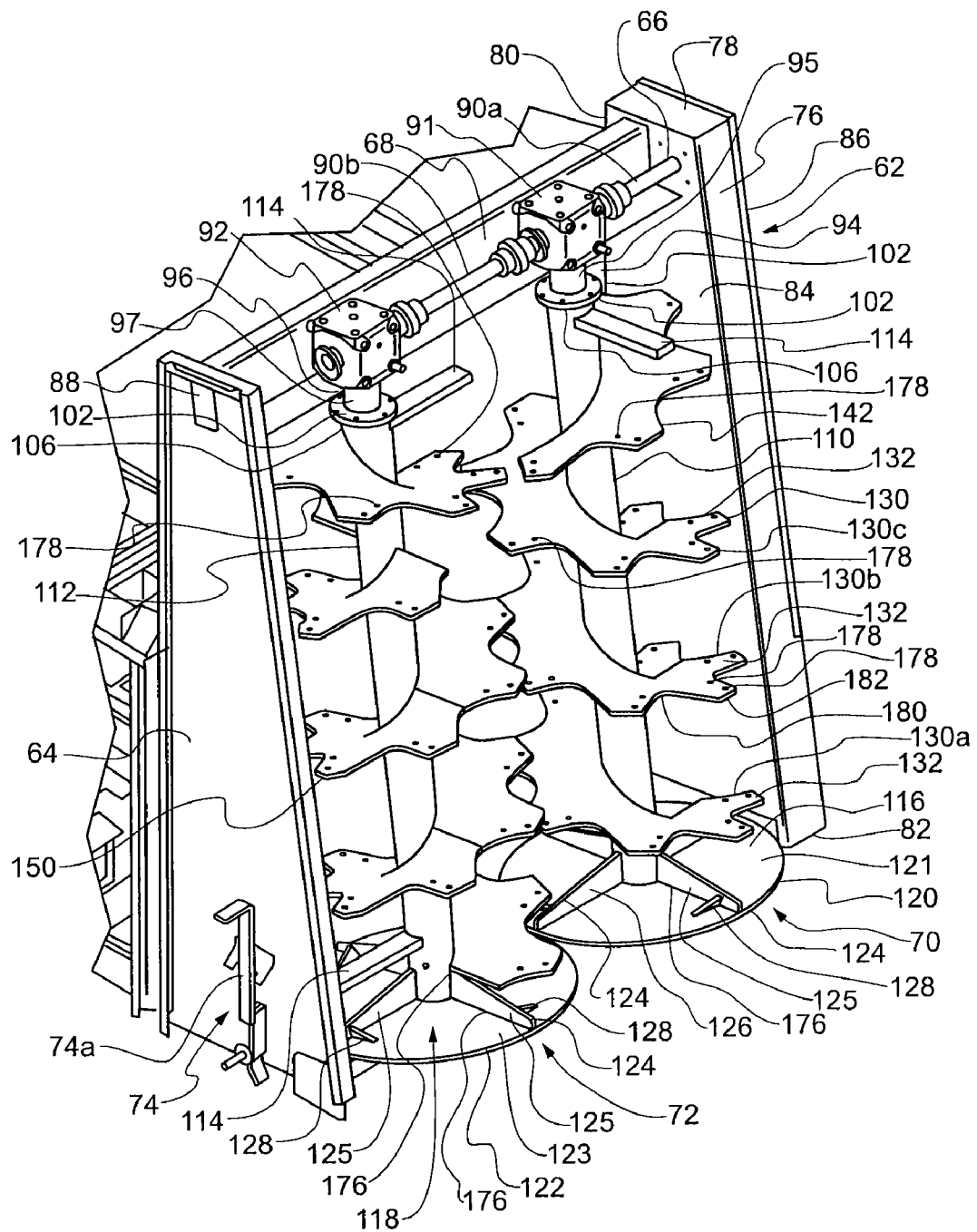
FIG. 4 is a perspective view of a vertical beater assembly.
Figure 5:
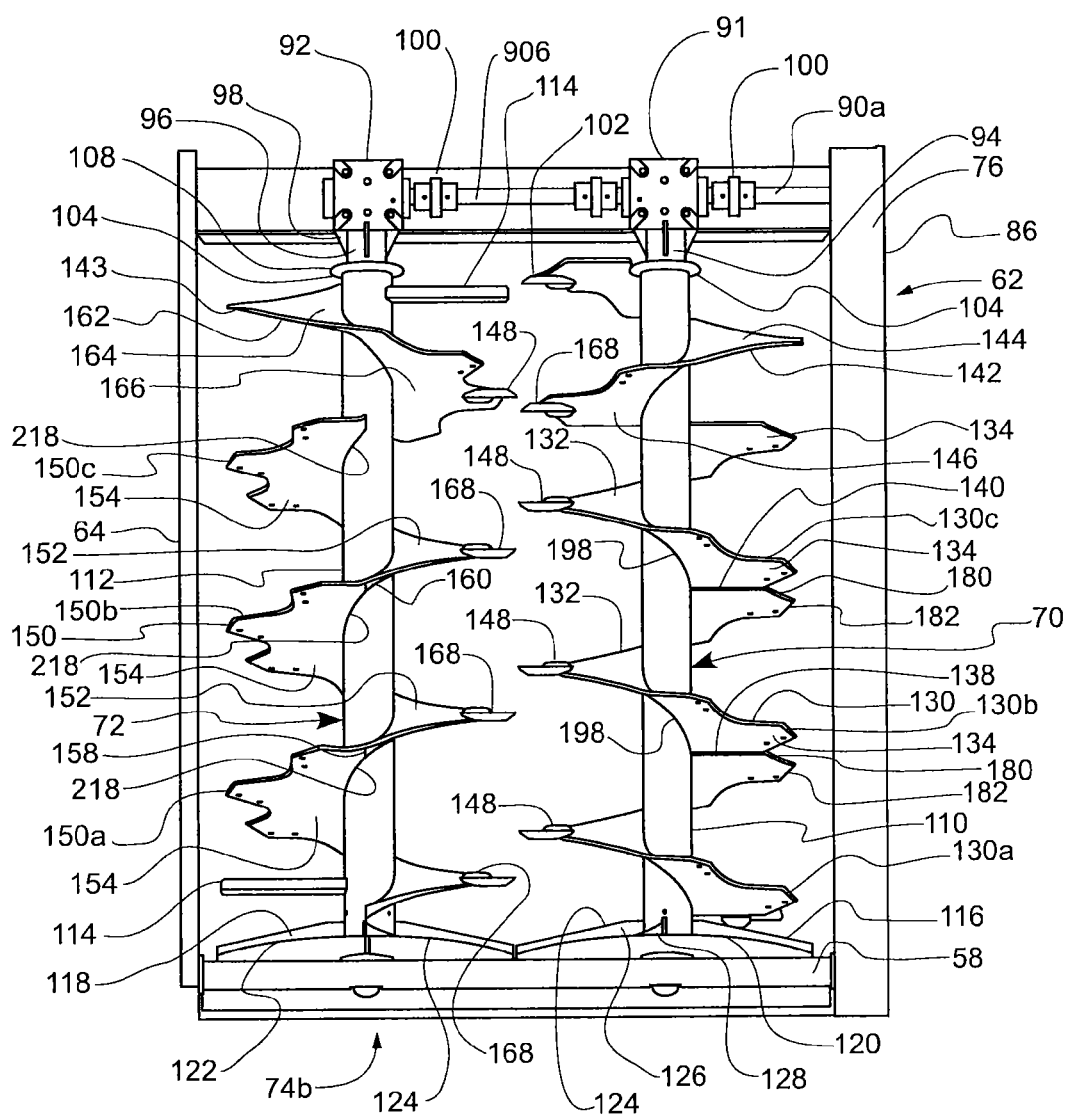
FIG. 5 is a front view of a vertical beater assembly.

Referring to FIGS. 4 and 5, vertical beater assembly 28 includes a beater assembly base 58, right-side cover 62, left-side cover 64, drive mechanism 66, drive shield 68, right beater 70, and left beater 72. Right beater 70 and left beater 72 are positioned substantially in parallel with each other, and substantially perpendicular to base 58. The top of each beater 70, 72 is mechanically operably coupled to drive mechanism 66 and the bottom of each beater is mechanically rotatably coupled to base 58. Although FIGS. 4 and 5 depict vertical beater assembly 28 as including two beaters 70, 72, namely right beater 70 and left beater 72, other embodiments may only include a single left or right beater 70 or 72.

Right-side cover 62 and left-side cover 64 may be generally trapezoidal in shape, with the bottom sides nearest base 58 being longer than the top sides nearest drive mechanism 66. In one embodiment, right-side cover 62 includes front panel 76, top panel 78, back panel 80, bottom panel 82, inside panel 84, and outside panel 86 to form an enclosure around a portion of drive mechanism 66. Left-side cover 64 includes access opening 88, which is typically rectangular and used to access drive mechanism 66. Right-side cover 62 and left-side cover 64 may be constructed of sheet metal with the various pieces either welded together, or held together with fasteners (not depicted).

The portion of drive mechanism 66 enclosed by right-side cover 62 is connected to drive shaft 90a, and to the power take-off of a towing vehicle (not depicted), and may be a chain, belt, or shaft drive system. Drive mechanism 66 also includes shaft 90b, right gear box 91, left gear box 92, right beater drive shaft 94, left beater drive shaft 96, and drive couplings 100. In one embodiment, beater drive shafts 94 and 96 extend downward toward their respective beaters and are housed within beater drive shaft housings 95 and 96, respectively. Drive flange assemblies 102 in one embodiment are keyed to right beater drive shaft 94 and left beater drive shaft 96, and include a plurality of flange holes 106 distributed around the perimeter of drive flange assemblies 102. Drive flange assemblies 102 connect to beater flanges 104 via flange fasteners 108, which may consist of a bolt and nut combination, or other fasteners known in the industry to used to connect two pipe flanges. Fasteners 108 are disposed in holes 106 and corresponding holes 105 defined in beater flanges 104.

In other embodiments, manure spreader 20 may include a drive mechanism 66 located below beaters 70 and 72, rather than above. In such an alternative embodiment, beaters 70 and 72 may be driven directly from below thereby eliminating portions of drive mechanism 66.

Vertical beater assembly 28 may also include a pan release assembly 74. Pan release assembly consists of a pivoting lever 74a connected via mechanical linkage to a substantially flat pan 74b located at a bottom side of beater assembly 28. Rotating the lever causes the pan to move in an upward or downward direction. During normal operation, lever 74a is locked into position causing pan 74b to be relatively close to vertical beaters 70 and 72. Pan 74b may be moved downward and away from the bottom side of vertical beater assembly 28 to facilitate cleaning or maintenance, or provide clearance for snow and ice.

Referring to FIG. 6, right beater 70 includes right beater shaft 110, beater flange 104, upper and lower balancing bars 114, right beater base 116, right-side forward flighting 130, right-side reverse flighting 142, right-handed beater blades 148, and left-handed beater blades 168. In one embodiment, right beater pipe 110 is 3" or 4" in diameter and made from standard steel pipe. However, nearly any pipe diameter and thickness able to withstand the forces inherent in vertical beater assembly 28 may be used. Similarly, beater flanges 104 may be steel and sized to fit for welding onto right beater pipe 110, or left beater pipe 112. Balancing bars 114 may be rectangular in cross section, made of steel, and are welded, or otherwise attached, to a top outer surface of each beater such that each bar 114 extends perpendicularly away from beater pipe 110. The purpose of balancing bars 114 is to act as a counter balance, adjusting the center of mass of a respective beater 70, 72 to match the center of rotation, thereby assuring that beaters 70 and 72 rotate without shaking or wobbling.

Right-side base 116 includes right disc 120, multiple paddles 124 and paddle gussets 128. In one embodiment, right disc 120 is a circular steel disc welded to one end of right beater pipe 110.

In one embodiment, four paddles 124 are welded to a top surface 121 of right disc 120 such that gusset-side surfaces 125 and non-gusset-side surfaces 126 lie in a plane substantially perpendicular to top surface 121. Paddles 124 may generally be a trapezoidal shape with the side closest to right beater pipe 110 having a length somewhat longer than its opposite side. The shape of paddles 124 may vary to include a rectangular shape, or other shape. Paddles 124 may be substantially evenly distributed around top surface 121. Although four paddles 124 per base are depicted and described, the number of paddles 124 may be more or less in other embodiments of the present invention.

At least one paddle gusset 128 may be used to strengthen each paddle 124. Paddle gussets 128 may be a small triangular piece of steel of varying shape or size, welded to right disc top surface 121 and gusset-side surface 125.

Figure 6A:
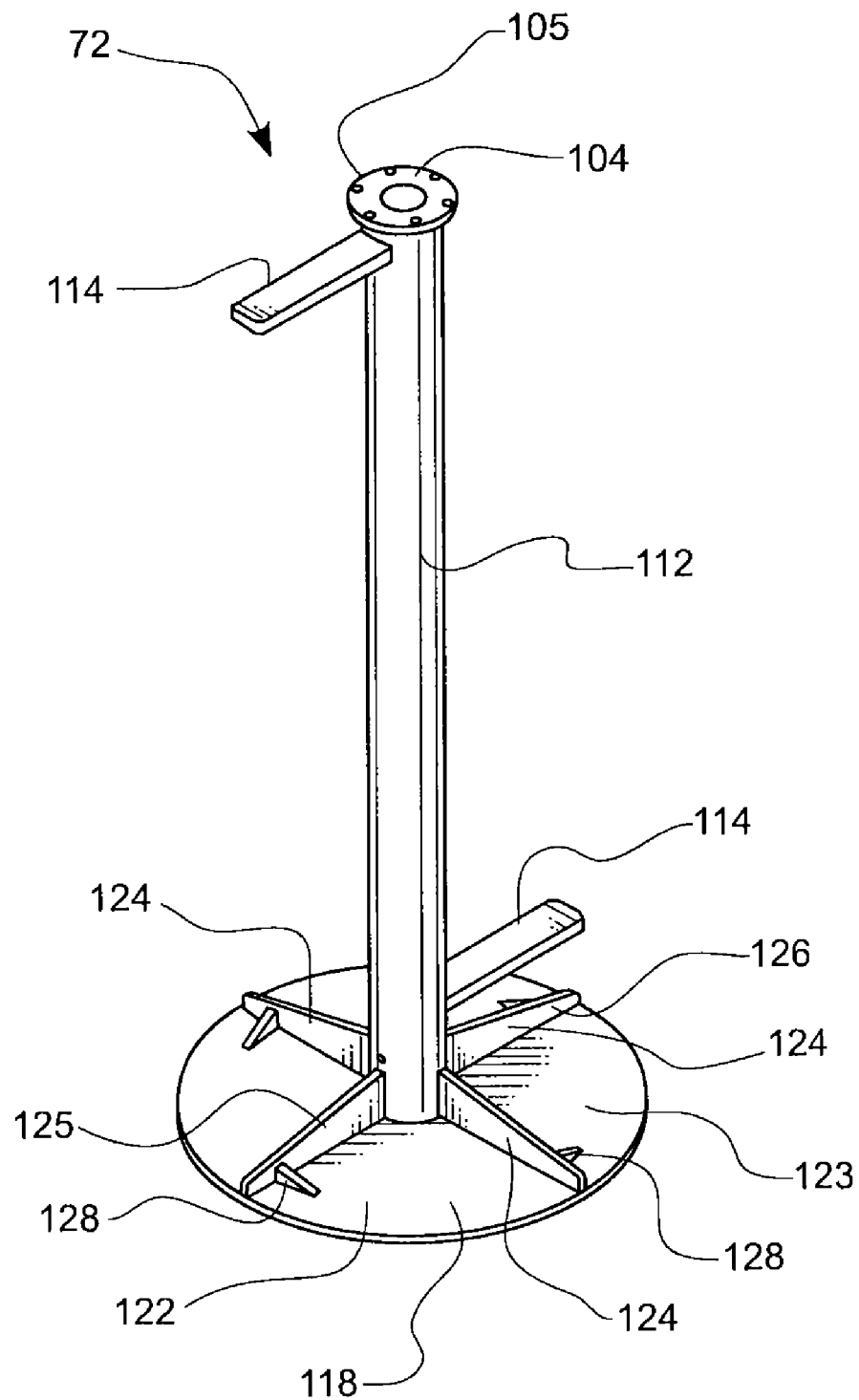
FIG. 6A is a perspective view of a portion of a left-side vertical beater.
Figure 7:
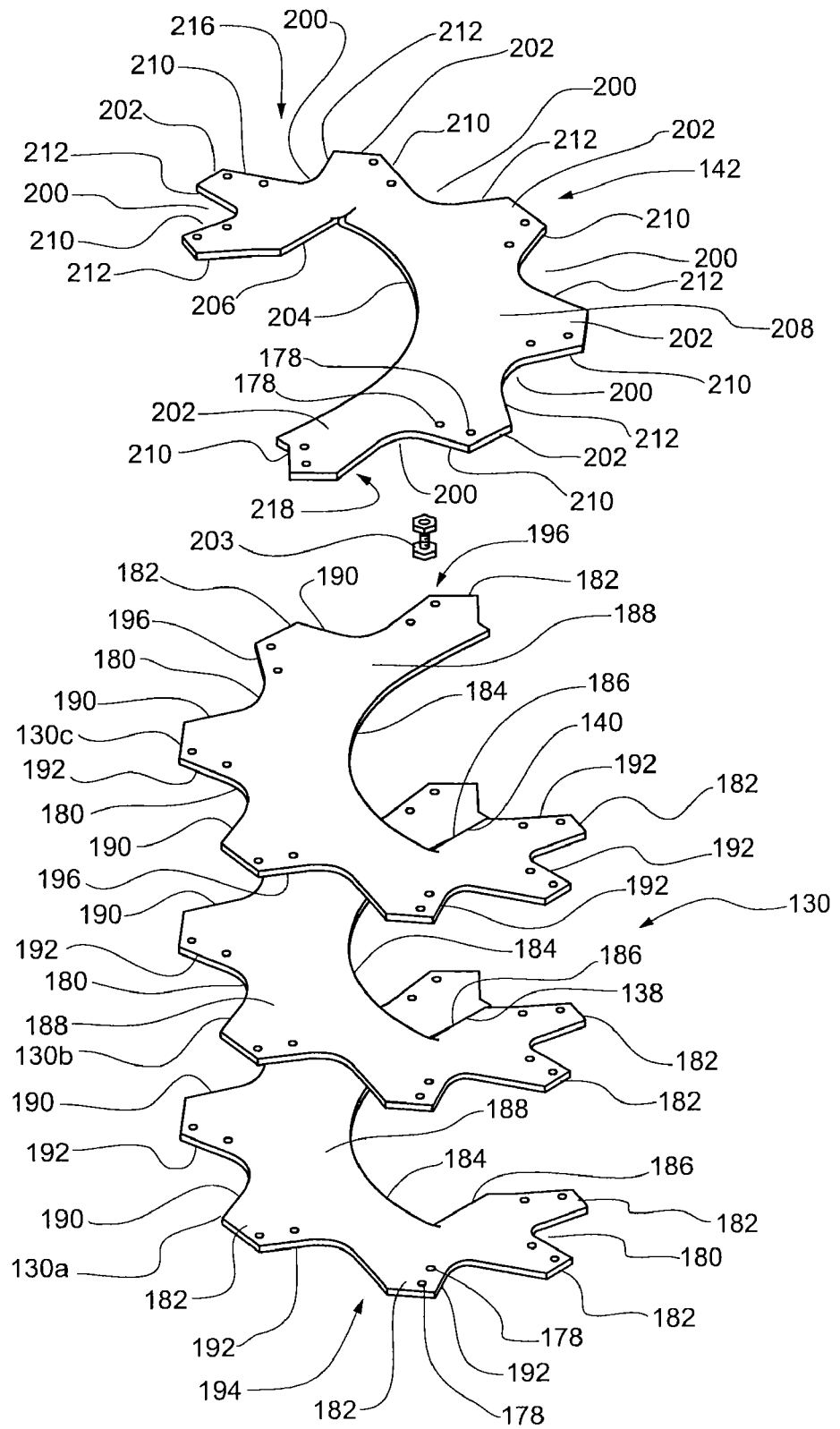
FIG. 7 is an exploded, perspective view of the flighting of the right-side vertical beater.

Referring to FIGS. 6 and 7, right-side forward directed flighting 130 is comprised of multiple flighting sections 130a, 130b, and 130c. In other embodiments, right-side forward flighting 130 may comprise more or less than three flighting sections, depending on the height of the beaters, and other factors relating to the angle of dispersion of manure. Section 130a is welded to section 130b at right-forward weld joint 138, and section 130b is welded to section 130c at right-forward weld joint 140. The three welded sections 130a-c together form right-side forward flighting 130, forming a right-handed helix that spirals upward in a generally clockwise direction.

In one embodiment, each flighting section 130a-c is constructed from a single uniform sheet of steel, preferably ⅜" thick. Each flighting section is cut from a flat sheet of steel, or other metal, into the desired shape, then formed, without rolling or flattening, to achieve a helical shape. This flighting and method of construction differs from that used in commercially available manure spreaders. Although some manure spreaders use auger-like vertical beaters, the flighting used in these commercially available spreaders typically are constructed from a single helicoid piece of sheet metal. In prior devices, a flat helicoid, or flat spiral shape, is cut out of sheet metal. The helicoid is then formed into an upward spiraling, or helical, single-piece flighting. The edges of the flighting are typically rolled to widen the outside diameter of the flighting to create an overall uniform flighting diameter. However, the rolling process thins the outer edges of the flighting, weakening the flighting. In contrast, the flighting of the present invention avoids the weaknesses incurred by rolling the steel during manufacture of the flighting, and instead maintains a uniform thickness by manufacturing the flighting section-by-section without rolling.

Still referring to FIG. 7, each right-side forward flighting section 130a-c includes beater blade mounting holes 178, right-forward notches 180, right-forward ears 182, right-forward curved inner surface 184, right-forward straight edge 186, right-forward top surface 188, right-forward trailing edge 190, right-forward leading edge 192, right-forward bottom end 194 and right-forward top end 196. On each flighting section 130a-c, a pair of beater blade mounting holes 178 is located nearest right-forward leading edge 192 of each right-forward ear 182, and receives beater blade fasteners 203, typically nuts and bolts. Right-forward ears 182 extend outwardly from inner surface 184 and define right-forward notches 180. Right-side forward flighting sections 130a-c together and individually form right-handed helices such that a top end 196 is located immediately above the bottom end 198 of the section 130 immediately below the respective top end 196.

Right-forward flighting sections 130a-c are welded to beater pipe 110 where right-forward curved inner surfaces 184 contact the outside surface of right beater pipe 110, forming a substantially continuous spiraling right-forward inside weld joint 198 as depicted in FIG. 5. Straight edges 186 of each flighting section meet to form joints 138 and 140.

Referring to FIG. 5, a plurality of right-handed beater blades 148 (see also FIG. 8 and) are removably attached to a respective right-side forward flighting section 130a-c at a right-side top surface 132. Beater blade fasteners (preferably nuts and bolts) are inserted through bores 266 of beater blades 148 and a pair of beater blade mounting holes 178 to attach the blades 148 to the flighting section 130a-c. Due to the location of mounting holes 178, right-handed beater blades 148 are located near right-forward leading edges 192 of flighting sections 130a-c.

Returning to FIG. 7, right-side reverse flighting 142 may be comprised of only one section of flighting, and includes beater blade mounting holes 178, right-reverse notches 200, right-reverse ears 202, right-reverse curved inner edge 204, right-reverse straight edge 206, right-reverse top surface 208, right-reverse trailing edges 210, right-reverse leading edges 212, right-reverse bottom end 214 and right-reverse top end 216. A pair of beater blade mounting holes 178 is located nearest right-reverse trailing edge 210 of each right-reverse ear 202 to receive beater blade fasteners 203. Right-reverse ears 202 extend outwardly from inner surface 204 and define right-reverse notches 200. Right-side reverse flighting 142 forms a left-handed helix such that top end 216 is located above bottom end 214. Accordingly, material (manure 54) is propelled in an opposing direction, as material that is propelled by flighting 130 by flighting 142. Flighting 142 is oppositely directed as compared to flighting 130.

Right-reverse flighting 142 is welded to beater pipe 110 where right-reverse curved inner surface 204 contacts the outside surface of right beater pipe 110, forming a substantially continuous right-reverse spiraling inside weld joint 238 as depicted in FIG. 5.

Referring still to FIG. 5, a plurality of left-handed beater blades 168 are removably attached to right-side reverse flighting 142 at a right-side reverse flighting bottom surface 146. Beater blade fasteners inserted through left-handed beater blades 168 and a pair beater blade mounting holes 178 to attach the blades to the flighting. Left-handed beater blades 168 are located near right-reverse trailing edges 210 of flighting 142.

As seen above, right-side reverse flighting 142 shares many of the same construction and design features of right-side forward flighting sections 130a-c, such as a plurality of ears, notches, beater blade mounting holes, and so on. Notably, right-side reverse flighting 142 differs from right-side forward flighting sections 130a-c in that right-side reverse flighting 142 forms a left-handed helix. Another notable difference includes the use of right-handed beater blades 148 on right-side forward flighting 130 versus left-handed beater blades 168 on right-side reverse flighting 142, as well as the location of the beater blades 168 on the flighting 142. On right-side forward flighting 130, the beater blades 148 are located on the top surface of the flighting 130, nearest the leading edges, while on reverse flighting 142, the beater blades 168 are located on the bottom surface of the flighting 142, nearer the trailing edges of the flighting 142. In some embodiments, a portion of each beater blade 148 and 168 extends beyond an outside edge of the respective flighting 130, 142.

Referring now to FIGS. 8a to 8d, each right-handed beater blade 148 includes a center portion 260, a partial width extension 262, a full-width extension 264, holes 266, top surface 268, bottom surface 270 and notch 272. In the embodiment depicted in FIGS. 8a to 8d, right-handed beater blade 148 is constructed of a single-piece of steel or other metal. However, in other embodiments, beater blades 148 may be constructed of multiple pieces of steel or other suitable materials.

Figure 8A:
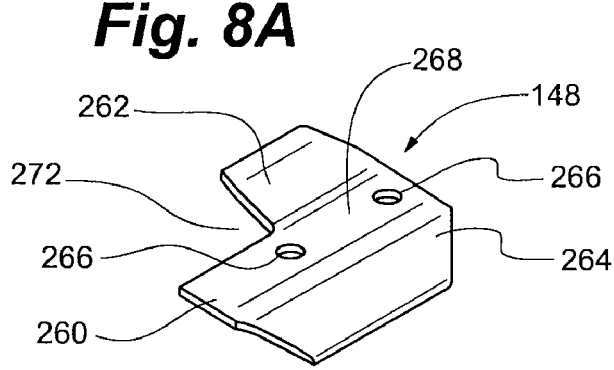
FIG. 8a is a perspective view of a right-handed beater blade.
Figure 8B:
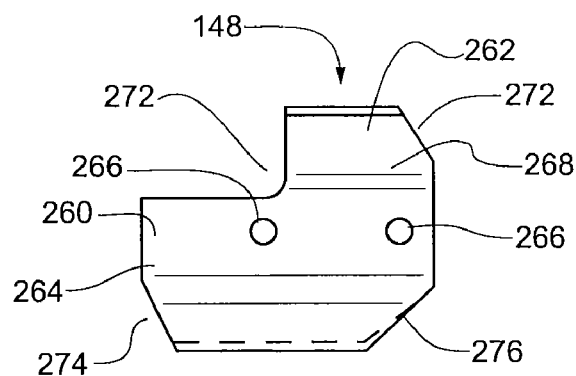
FIG. 8b is a top view of a right-handed beater blade.

As best depicted in FIG. 8b, center portion 260 and partial width extension 262 cooperatively define notch 272. Each right-handed beater blade 148 may also include a pair of holes 266 in center portion 260. Holes 266 align with beater blade mounting holes 178 on right-side forward flighting 130 and left-side reverse flighting 162. Beater blade fasteners 203 pass through holes 266 and 178 to fasten each beater blade to its appropriate flighting 130, 142. Beater blade fasteners 203 may be screws, nut and bolt combinations, rivets, or other known fastener types. Right-handed beater blade 148 also includes three mitered corners 274, 276, and 278.

Figure 8C:
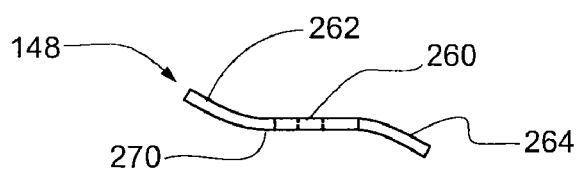
FIG. 8c is a side view of a right-handed beater blade.
Figure 8D:
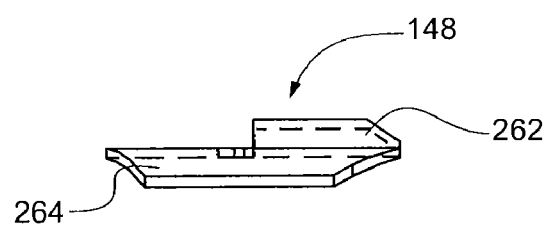
FIG. 8d is a front view of a right-handed beater blade.

As best depicted in FIG. 8c, a substantial portion of center portion 260 is relatively flat, while partial-width extension 262 and full-width extension 264 are curved. Partial-width extension 262 curves upwards and away from center portion 260, while full-width extension 264 curves downward and away from center section 260. When viewed from the side, right-handed beater blade 148 depicts a relatively shallow sigmoid.

Referring now to FIGS. 9a to 9d, each left-handed beater blade 168 includes a center portion 280, a partial-width extension 282, a full-width extension 284, holes 266, top surface 288, bottom surface 290 and notch 292. In the embodiment depicted in FIGS. 9a to 9d, left-handed beater blade 168 is constructed of a single piece of steel or other metal. However, in other embodiments, beater blades may be constructed of multiple pieces of steel or other suitable materials.

Figure 9A:
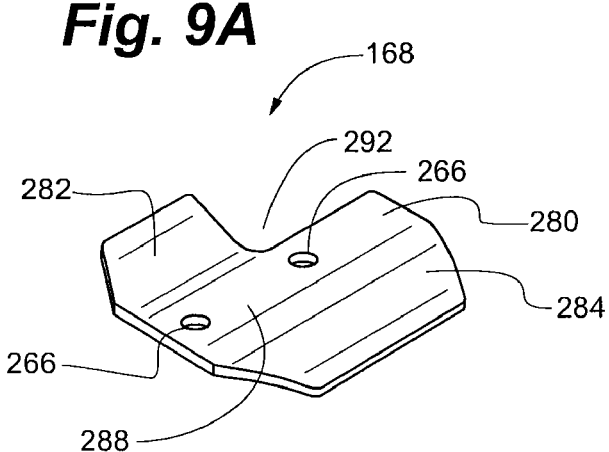
FIG. 9a is a perspective view of a left-handed beater blade.
Figure 9B:
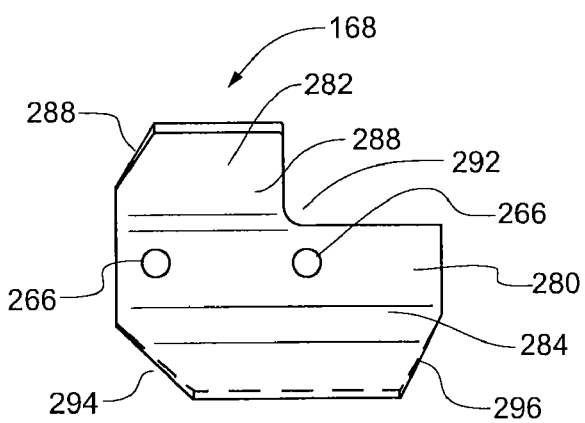
FIG. 9b is a top view of a left-handed beater blade.

As best depicted in FIG. 9b, center portion 280 and partial-width extension 282 define notch 292. Each right-handed beater blade 168 may also include a pair of holes 266 in center portion 260. Holes 266 align with beater blade mounting holes 178 on right-side reverse flighting 142 and left-side forward flighting 150. Beater blade fasteners 203 pass through holes 266 and 178 to fasten each beater blade to its appropriate flighting. Right-handed beater blade 148 also includes three mitered corners 294, 296, and 298.

Figure 9C:
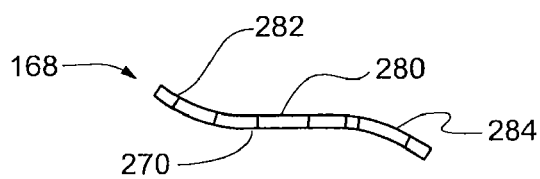
FIG. 9c is a side view of a left-handed beater blade.
Figure 9D:
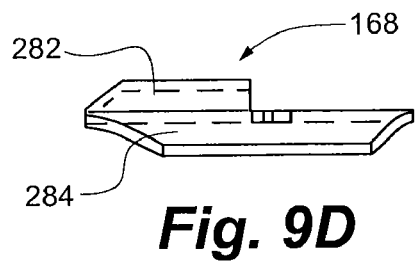
FIG. 9d is a front view of a left-handed beater blade.

As best depicted in FIG. 9c, a substantial portion of center portion 280 is relatively flat, while partial-width extension 282 and full-width extension 284 are curved. Partial-width extension 282 curves upwards and away from center portion 280, while full-width extension 284 curves downward and away from center section 280. When viewed from the side, left-handed beater blade 168 depicts a relatively shallow sigmoid.

Referring again to FIG. 6, left beater 72 is substantially similar to right beater 70. Primary differences include flighting type and location, positioning of right-handed versus left-handed beater blades, and the location of paddle gussets. Such differences are apparent when comparing the depictions of FIGS. 7 and 10. As such, the above descriptions relating to right beater 70 materials, construction, and most other properties also apply to left beater 72.

Figure 10:
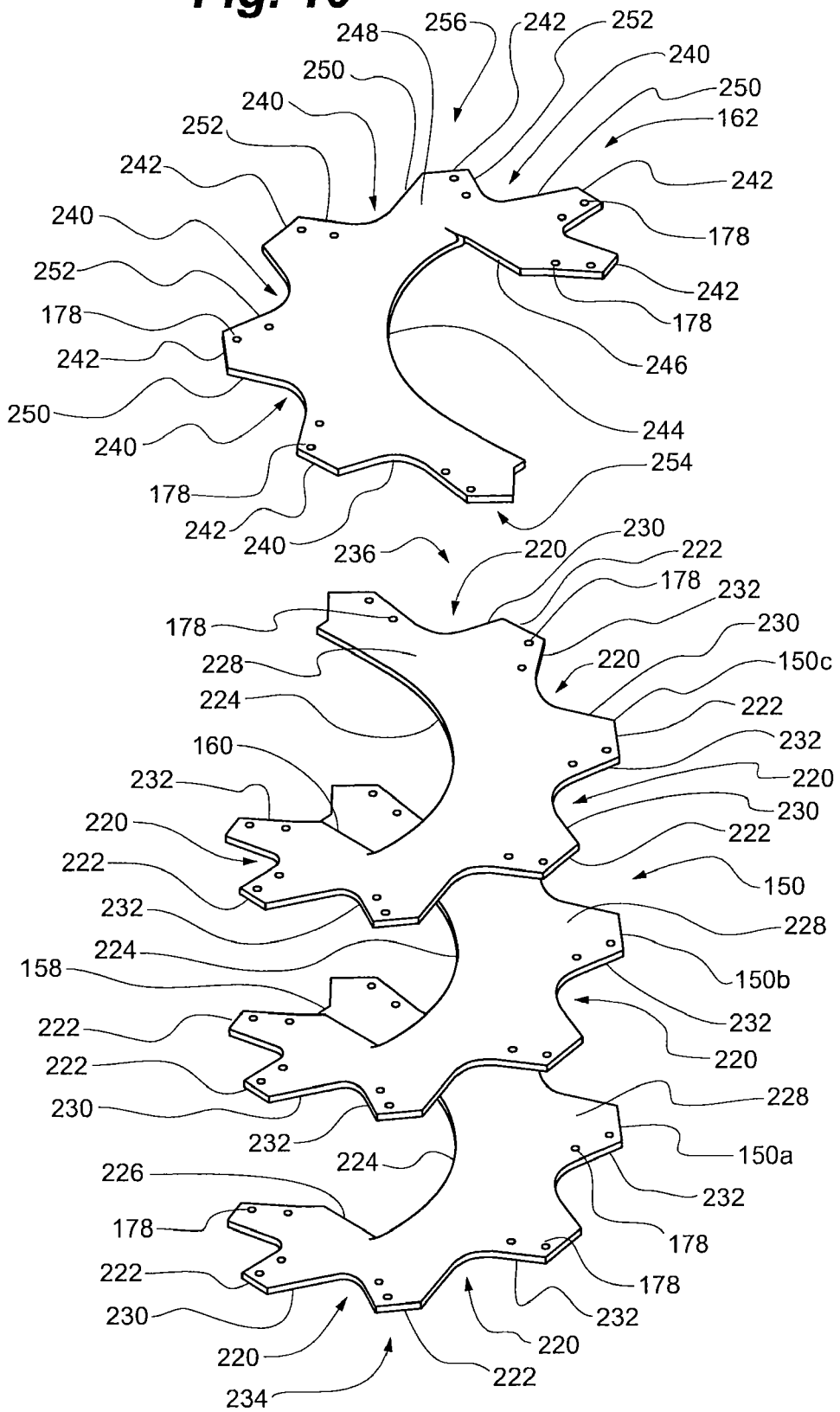
FIG. 10 is an exploded, perspective view of the flighting of a left vertical beater.

Referring to FIGS. 6a and 10, left beater 72 includes left beater pipe 112, a beater flange 104, balancing bars 114, left beater base 118, left-side forward flighting 150, left-side reverse flighting 162, right-handed beater blades 148, and left-handed beater blades 168.

As depicted in FIG. 6a, left beater base 118 includes left disc 122, multiple paddles 124 and paddle gussets 128. In one embodiment, left disc 122 is a circular steel disc welded to one end of left beater pipe 112. Four paddles 124 are welded to a top surface 123 of left disc 122 such that gusset-side surfaces 125 and non-gusset-side surfaces 126 lie in a plane substantially perpendicular to top surface 123. Paddles 124 may generally be a trapezoidal shape with the side closest to left beater pipe 112 having a length somewhat longer than its opposite side. The shape of paddles 124 may vary to include a triangular shape, rectangular shape, or other shape. Paddles 124 may be substantially evenly distributed around top surface 123. Although four paddles 124 per base are depicted and described, the number of paddles 124 may be more or less in other embodiments of the present invention.

At least one paddle gusset 128 is used to support each paddle 124. Paddle gussets 128 may be a small triangular piece of steel of varying shape or size, welded to right disc top surface 123 and gusset-side surface 125.

Referring to FIG. 10, left-side forward flighting 150 is comprised of multiple flighting sections 150a, 150b, and 150c. In other embodiments, left-side forward flighting 150 may comprise more or less than three flighting sections, depending on the height of the beaters, and other factors. Section 150a is welded to section 150b at left-forward weld joint 158, and section 150b is welded to section 150c at left-forward weld joint 160. The three welded sections 150a-c together form left-side forward flighting 150 that forms a left-handed helix that spirals upward in a generally counter-clockwise direction.

As still depicted in FIG. 10, each left-side forward flighting section 150a-c includes beater blade mounting holes 178, left-forward notches 220, left-forward ears 222, left-forward curved inner surface 224, left-forward straight edge 226, left-forward top surface 228, left-forward trailing edges 230, left-forward leading edges 232, left-forward bottom end 234 and left-forward top end 236. On each flighting section, a pair of beater blade mounting holes 178 is located nearest left-forward leading edge 232 of each left-forward ear 222, and receives beater blade fasteners. Left-forward ears 222 extend outwardly from inner surface 234 and define left-forward notches 220. Left-side forward flighting sections 150a-c together and individually form left-handed helices such that each top end 236 is located above each bottom end 238. Note that right-side forward flighting 130 forms a right-handed helix.

Left-forward flighting sections 150a-c are welded to beater pipe 112 where left-forward curved inner surfaces 234 contact the outside surface of left beater pipe 112, forming a substantially continuous left-forward inside weld joint 238 as depicted in FIG. 5. Straight edges 226 of each flighting section meet to form joints 158 and 160.

Referring to FIG. 5, a plurality of left-handed beater blades 168 are removably attached to left-side forward flighting 150 at a left-forward top surface 228. Beater blade fasteners inserted through beater blades 148 and a pair beater blade mounting holes 178 to attach the blades to the flighting. Due to the location of the mounting holes 178, left-handed beater blades 168 are located near left-forward leading edges 232 of flighting 150.

FIG. 10 depicts left-side reverse flighting 162 that may be comprised of only one section of flighting, and includes beater blade mounting holes 178, left-reverse notches 240, left-reverse ears 242, left-reverse curved inner edge 244, left-reverse straight edge 246, left-reverse top surface 248, left-reverse trailing edges 250, left-reverse leading edges 252, left-reverse bottom end 254 and left-reverse top end 256. A pair of beater blade mounting holes 178 is located nearest left-reverse trailing edge 250 of each left-reverse ear 242 to receive beater blade fastener. Left-reverse ears 242 extend outwardly from inner surface 244 and define left-reverse notches 240. Left-side reverse flighting 162 forms a right-handed helix such that top end 256 is located above bottom end 254. Note that right-side reverse flighting 142 forms a left-handed helix.

Left-reverse flighting 162 is welded to beater pipe 112 where left-reverse curved inner surface 244 contacts the outside surface of right beater pipe 112, forming a substantially continuous left-reverse inside weld joint 258 as depicted in FIG. 5.

Referring still to FIG. 5, a plurality of right-handed beater blades 148 are removably attached to left-side reverse flighting 162 at a left-side reverse flighting bottom surface 166. Beater blade fasteners inserted through right-handed beater blades 168 and a pair of beater blade mounting holes 178 to attach the blades to the flighting. Right-handed beater blades 148 are located near left-reverse trailing edges 250 of flighting 162.

In the embodiment depicted in FIGS. 7 and 10, each right-forward flighting section 130a-c may be substantially the same as left-reverse flighting 62, while each left-forward flighting section 150a-c may be substantially the same as right-reverse flighting 142. Although in this embodiment, forward flighting 130 and 150 have been described as comprising a plurality of flighting sections, and reverse flighting 142 and 162 have been described as comprising a single flighting section, the number of forward and reverse flighting sections may be increased or decreased for ease of production, to modify manure spread patterns, or for other reasons.

In operation, manure 54 is loaded into box 24 of manure spreader 20. A vehicle, typically a tractor (not shown), connects to hitch 26 and tows manure spreader 20 over the area onto which manure 54 is to be spread.

If manure spreader 20 is a push-gate style spreader as depicted in FIGS. 1 and 3, hydraulic ram 48 together with push gate drive mechanism 46 move push gate 50 towards the rear of material spreader 20. Push gate 50 applies a force against manure 54, moving it towards the rear of material spreader 20 and towards vertical beater assembly 28. In some embodiments, a load bed 56 located in spreader floor 44 assists in moving manure 54 towards beater assembly 28. In other embodiments, one or more augers, a conveyor, apron chain assembly, or other device moves manure 54 toward beater assembly 28.

Referring to FIGS. 4 and 5, a power take-off (not shown) from the towing vehicle provides power to drive mechanism 66 to turn a series of drive shafts, including drive shafts 90a and 90b. Power from rotating drive shaft 90a is transferred through a first coupling 100 into right gear box 91 located above right beater 70, and to drive shaft 90b. Drive shaft 90b in turn transfers power to left gear box 92 located above left beater 72.

Gear boxes 91 and 92 provide power to respectively rotate beater drive pipes 94 and 96. A drive flange assembly 102 attached to each beater drive pipe 94 and 96 couples the beater drive pipes 94 and 96 of drive mechanism 66 to vertical beater assemblies 70 and 72. The rotation of beater drive pipe 94 causes right beater 70 to rotate and the rotation of beater drive pipe 96 causes left beater 72 to rotate. In one embodiment, right beater 70 rotates in a counter-clockwise direction when viewed from above, while left beater 72 rotates in a clockwise direction. The speed of rotation may be varied according to manure 54 properties, desired spread pattern, and other considerations.

Figure 11:
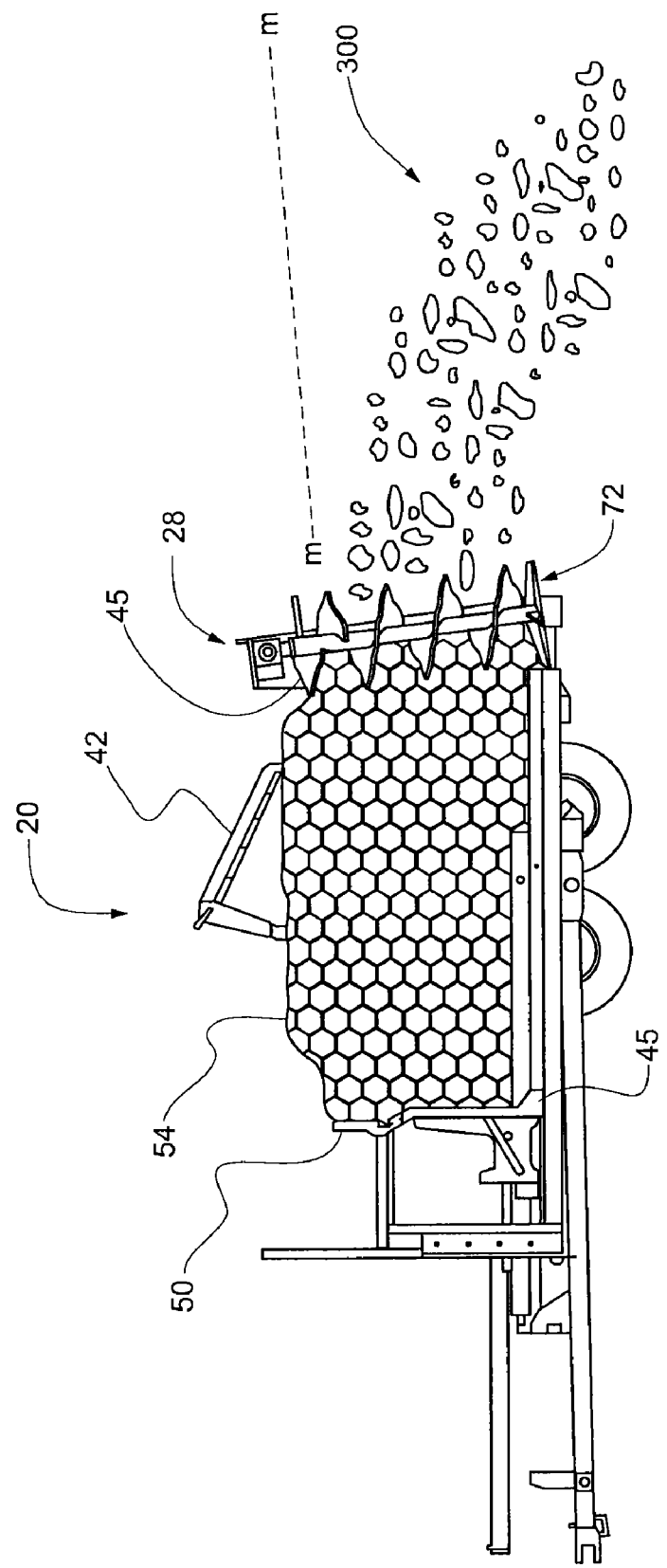
FIG. 11 is a cross sectional view of a manure spreader spreading manure.

Referring to FIG. 11, rear gate 42 is lifted to created a manure discharge opening 45. Push gate 50 moves manure 54 contained in manure spreader 20 towards vertical beater assembly 28 and through manure discharge opening 45. Rotating right beater 70 and left beater 72 contact manure 54 and propel manure 54 outwards and away from manure spreader 20. The distance that manure 54 travels and the particular manure spread pattern depend on a number of factors, including, number of beaters, rotational speed of beaters, flighting length and angle, manure properties, and so on. FIG. 11 depicts a side view of a typical spread pattern 300. In this view, it can be seen that manure 54 generally stays below a plane m as it is propelled outwards and away from manure spreader 20.

Figure 12:
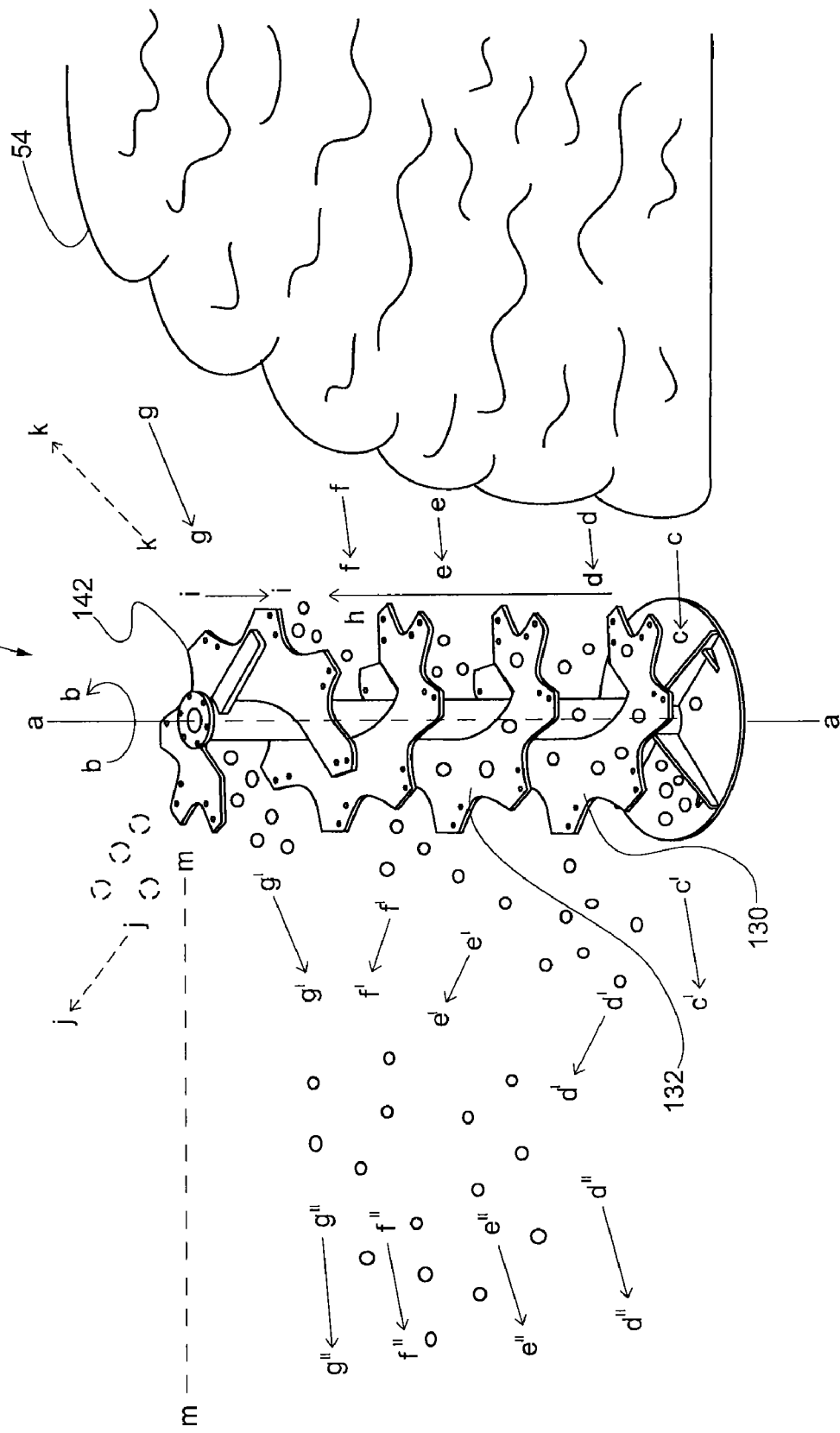
FIG. 12 is a perspective view of a vertical beater receiving and expelling manure.

FIG. 12 depicts the movement of manure 54 into, then away from right beater 70, during operation of manure spreader 20. In the embodiment of FIG. 12, beater blades 148 and 168 are attached to right beater 70 as previously described, but are not shown. Right beater 70 rotates about axis a in a generally counter-clockwise direction as viewed from above, and indicated by arrow b. Manure 54 approaches right beater 70 generally in the directions indicated by arrows c through g. Manure 54 contacts right beater 70 at various locations along right-side forward flighting 130 and right-side reverse flighting 142.

Manure 54 moving in the direction of arrow c contacts the lower portion of right beater 70 at right beater base 116, and is propelled away from manure spreader 20 in the direction of arrow c' by rotating paddles 124.

As manure 54 moving in the directions of arrows d, e, and f contacts rotating right-side forward flighting 130 at right-side forward flighting top surface 132, manure 54 is propelled in a generally upward direction as indicated by arrow h. Manure 54 propelled by right-side forward flighting 130 exits vertical beater assembly 28 initially traveling in the general directions indicated by arrows d', e', and f'.

Manure 54 moving in the direction indicated by arrow g contacts right beater 70 at right-side reverse flighting 142. Unlike right-side forward flighting 130 which forms a right-handed helix, right-side reverse flighting 142 forms a left-handed helix. Therefore, when rotated in a counter-clockwise direction, right-side reverse flighting 142 tends to push manure 54 in a generally downward direction as indicated by arrow i. As such, manure 54 contacting right beater 70 in the vicinity of right-side forward flighting 130 moves manure 54 in a generally upward direction h, while manure 54 contacting right beater 70 at right-side reverse flighting 142 moves manure 54 in a generally downward direction i. After contacting right-side reverse flighting 142, manure 54 exits vertical beater assembly 28 initially traveling in the general direction indicated by arrow g'.

After exiting vertical beater assembly 28, manure 54 traveling upward and away from manure spreader 20 in the directions as indicated by arrows d', e', and f', contacts and manure 54 traveling generally downward in the direction g' and away from manure spreader 20. The force of downward traveling manure 54 acting upon the upward traveling manure 54 flattens the trajectory of both manure streams resulting in a mixture of manure 54 traveling generally in the direction as indicated by arrows d", e", f" and g".

Additionally, some manure 54 may initially be directed away from vertical beater 70, but towards box 24. For example, a portion of manure 54 contacting a lower portion of vertical beater 70 at right-side forward flighting 130 may travel upwardly and forwardly in a direction toward the front of manure spreader 20. If this occurs, this upwardly and forwardly traveling portion of manure 54 will collide with manure 54 located in the interior of box 24, stopping its travel.

Portions of manure 54 contacting an upper portion of vertical beater 70 at right-side reverse flighting 142 may also travel in a forwardly direction toward box 24. However, portions of manure 54 contacting reverse flighting 142, though propelled in a forward direction toward box 24, will be directed downward into manure 54 located within box 24. In this manner, little or no manure 54 is propelled outside box 24 in the direction of the front of manure spreader 20.

Projecting portions of manure 54 contacting flighting located on an upper end of a vertical beater in a generally downward direction differs from prior art manure spreaders and beaters which utilize helical flighting. Prior art spreaders that do not utilize both forward and reverse flighting on a beater tend to cause portions of manure 54 or debris within manure 54 or box 24, to travel at a general height and direction as indicated by line k in FIG. 12. Portions of manure 54 traveling in direction k present a potential safety hazard, or at least a breakage hazard, as portions of manure 54 may strike equipment or persons located near the front of manure spreader 20.

Beater blades 148 and 168 also contact manure 54, causing manure 54 to break apart into smaller pieces for uniform distribution. Extensions 262, 264, 282, 284, mitered corners 274-278 and 294-298, along with notches 272 and 292 contribute to the separation or breaking apart of manure 54. At the same time, the sigmoid shape of beater blades 148 and 168, along with the extensions and notches create air currents in the vicinity of flighting surfaces 132, 134, 144, and 146 when right beater 70 is rotated. These air currents created by beater blades 148 and 168 reduce, or eliminate, the build up of manure 54 on flighting surfaces 132, 134, 144, and 146.

Similarly, in an embodiment having both a right beater 70 and a left beater 72, the rotation of left beater 72 operates much the same way as described above regarding the rotation of right beater 70. However, left beater 72 rotates in a direction opposite to right beater 72, or in one embodiment in a generally clockwise direction. Therefore, the description above regarding the rotation of right beater 70 and resulting spreading of manure 54 applies equally to left beater 72.

The resultant mixture of distributed manure 54 forms a manure spread pattern 300 that generally stays below a plane m as indicated in both FIGS. 11 and 12. The downward traveling manure 54 also significantly reduces, or even eliminates, the amount of stray pieces of manure 54 that could potentially travel upwards of plane m. This includes, for example, manure 54 or other debris that otherwise might be propelled in an upward, or even backward, direction as indicated by arrows j and k, potentially causing damage to a tractor operator, equipment, or other persons.

In addition to the above-described safety benefits, the vertical beater assembly 28 of the present invention also provides a more controlled and uniform spread pattern 300. By restricting the flow of manure 54 to a region below plane m, the trajectories of manure 54 are less likely to be affected by cross winds encountered during spreading.

The invention therefore addresses and resolves many of the deficiencies and drawbacks previously identified. The invention may be embodied in other specific forms without departing from the essential attributes thereof; therefore, the illustrated embodiments should be considered in all respects as illustrative and not restrictive. The claims provided herein are to ensure adequacy of the present application for establishing foreign priority and for no other purpose. Furthermore, for purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A manure spreader comprising:
a box including a front end, rear end, and sides defining an interior and an opening;
a manure transfer mechanism located at least in part within the interior of the box and defining a manure path of travel, the manure transfer mechanism for transferring manure in the interior of the box along the path of travel toward the opening of the box; and
a vertical beater assembly located adjacent the opening of the box for engaging and expelling manure from the box, the vertical beater assembly including at least a first vertical beater rotatable about a first fixed axis in a first direction, the first vertical beater including a shaft having a first flighting forming a first helix thereon, and a second flighting forming an oppositely directed helix extending thereon, the first fixed axis generally transverse to the manure path of travel.

2. The manure spreader of claim 1 further comprising a second vertical beater, wherein the second vertical beater includes a shaft having a first flighting forming a right-handed helix extending thereon, and a second flighting forming a left-handed helix extending thereon.

3. The manure spreader of claim 1 wherein the first flighting comprises a plurality of flighting sections, each section having a substantially uniform thickness.

4. The manure spreader of claim 1 wherein the first fighting and second fighting each comprise a plurality of ears and notches.

5. The manure spreader of claim 1 further comprising a plurality of first beater blades attached to the first flighting and a plurality of second beater blades attached to the second flighting.

6. The manure spreader of claim 5 wherein the plurality of first beater blades are located on a top surface of the first flighting, and the plurality of second beater blades are located on a bottom surface of the second fighting.

7. The manure spreader of claim 5 wherein the first and second plurality of beater blades each form a sigmoid shape, and a portion of each beater blade extends beyond an outer edge of the flighting to which it is attached.

8. The manure spreader of claim 7 wherein the portion of each beater blade extending beyond an outer edge of the fighting to which it is attached comprises a notch.

9. A vertical beater for spreading manure, comprising:
a shaft rotatable about an axis, the shaft including a first end and a second end, the first and second ends held in a fixed position relative to one another to define the axis;
a first flighting section affixed to a lower portion of the shaft, wherein the lower flighting section forms a lower helix spiraling in a first direction about the shaft;
a second flighting affixed to an upper portion of the shaft, wherein the upper fighting section forms an upper helix spiraling in a second direction about the shaft and the second direction is substantially opposite the first direction; and
a plurality of first beater blades affixed to a top surface of the first flighting section and a plurality of second beater blades affixed to a bottom surface of the second flighting sections.

10. The manure spreader of claim 1, wherein the opening is located at a rear portion of the box.

11. The manure spreader of claim 1, wherein the box comprises a front wall, left wall, right wall and bottom wall.

12. The manure spreader of claim 1, wherein the manure spreader transfer mechanism comprises a hydraulic ram and push-gate.

13. The manure spreader of claim 1, further the vertical beater assembly further comprises a second vertical beater rotatable about a second fixed axis in a second direction.

14. The manure spreader of claim 13, wherein the second direction is substantially opposite the first direction.

15. The manure spreader of claim 9, wherein each of the plurality of first beater blades are substantially the same as each of the plurality of second beater blades.

16. A manure spreader comprising:
a box adapted to hold manure and defining an opening;
a manure transfer mechanism adapted to transfer manure in the box towards the opening of the box; and
a pair of vertical beaters adjacent the opening of the box and adapted to receive manure from the manure transfer mechanism and expel the manure from the box, the pair of vertical beaters including:

a first vertical beater having a first shaft with a first end connectable to a drive mechanism and a second end connectable to a base, the first end and the second end fixed relative to one another to define a first fixed axis, the first shaft rotatable about the first fixed axis in a first direction, and having a first flighting forming a first helix thereon, and a second flighting forming an oppositely directed helix extending thereon; and a second vertical beater having a second shaft with a first end connectable to a drive mechanism and a second end connectable to a base, the first end and the second end fixed relative to one another to define a second fixed axis, the second shaft rotatable about the second fixed axis in a second direction, and having a first flighting forming a first helix thereon, and a second flighting forming an oppositely directed helix extending thereon.

17. The manure spreader of claim 16, wherein the first direction is substantially opposite the second direction.

18. The manure spreader of claim 16, wherein the first helix formed of the first flighting of the first beater forms a right-handed helix, and the first helix formed of the first fighting of the second beater forms a left-handed helix.

19. The manure spreader of claim 18, wherein the second helix formed of the second flighting of the first beater forms a left-handed helix, and the second helix formed of the second flighting of the second beater forms a right-handed helix.

20. The manure spreader of claim 16 wherein each of the first vertical beater and the second vertical beater further has left-handed beater blades and right-handed beater blades.

* * * * *